(12) United States Patent
Kim

(10) Patent No.: US 7,743,042 B2
(45) Date of Patent: Jun. 22, 2010

(54) APPARATUS AND METHOD FOR PROVIDING REMOTE USER INTERFACE SERVICE

(75) Inventor: Che-uk Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 193 days.

(21) Appl. No.: 11/634,877

(22) Filed: Dec. 7, 2006

(65) Prior Publication Data

US 2007/0174297 A1 Jul. 26, 2007

(30) Foreign Application Priority Data

Jan. 18, 2006 (KR) .................. 10-2006-0005510

(51) Int. Cl.
*G06F 7/00* (2006.01)
*G06F 17/30* (2006.01)

(52) U.S. Cl. .................. 707/705; 707/781; 707/782

(58) Field of Classification Search .................. 707/10, 707/1–4; 370/401
See application file for complete search history.

(56) References Cited

U.S. PATENT DOCUMENTS

| 7,398,305 | B2* | 7/2008 | Bodin et al. | 709/222 |
| 7,574,660 | B2* | 8/2009 | Campbell et al. | 715/741 |
| 2003/0001883 | A1 | 1/2003 | Wang | |
| 2003/0105854 | A1* | 6/2003 | Thorsteinsson et al. | 709/223 |
| 2005/0232283 | A1* | 10/2005 | Moyer et al. | 370/401 |
| 2006/0155851 | A1* | 7/2006 | Ma et al. | 709/226 |
| 2006/0159110 | A1* | 7/2006 | Choi et al. | 370/401 |
| 2008/0069121 | A1* | 3/2008 | Adamson et al. | 370/401 |
| 2008/0205419 | A1* | 8/2008 | Shin et al. | 370/401 |

FOREIGN PATENT DOCUMENTS

| KR | 10-2001-0048601 A | 6/2001 |
| KR | 10-2005-0012266 A | 1/2005 |
| KR | 10-2005-0076962 A | 7/2005 |
| KR | 10-2005-0079479 A | 8/2005 |
| KR | 10-2005-0079480 A | 8/2005 |
| WO | WO 03-107594 | 12/2003 |
| WO | 2005/062155 A1 | 7/2005 |
| WO | 2005/125102 A1 | 12/2005 |

* cited by examiner

*Primary Examiner*—Don Wong
*Assistant Examiner*—Merilyn P Nguyen
(74) *Attorney, Agent, or Firm*—Sughrue Mion, PLLC

(57) ABSTRACT

An apparatus and method for providing Remote User Interface (RUI) service are provided. The apparatus includes a service browser module and a virtual RUI server module. The service browser module communicates with a service registry, which is located outside a home network, and provides a service search User Interface (UI) to allow an RUI client, which is located inside a home network, to search for services that are present outside the home network. The virtual RUI server module is responsible for intermediation so that the services present outside the home network can be used through a service UI.

7 Claims, 7 Drawing Sheets

APPARATUS AND METHOD FOR PROVIDING REMOTE USER INTERFACE SERVICE

CROSS-REFERENCE TO RELATED APPLICATION

This application claims priority from Korean Patent Application No. 10-2006-0005510 filed on Jan. 18, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to providing remote user interface service and, more particularly, to providing a Remote User Interface (RUI) service, which can extend Universal Plug-and-Play (UPnP) service outside a home network using Open Service Gateway Initiative (OSGi) technology.

2. Description of the Related Art

UPnP RUI is a UPnP standard technology for providing user interfaces (UIs) between UPnP devices connected to a home network. For example, UPnP RUI technology allows application UIs, which reside in a Personal Computer (PC) located in a study room, to be accessed and manipulated through a digital television (DTV) located in a living room.

FIG. 1 is a conceptual diagram of a related art UPnP RUI. The UPnP RUI includes an RUI server 20, an RUI client 10, and an RUI control point 30.

The RUI server 20 provides a service UI for providing applications or services to a remote RUI client 10 through a UPnP network.

The RUI client 10 is a device for remotely executing or manipulating the applications of the RUI server 20 through the service UI provided by the RUI server 20. Accordingly, the RUI client 10 has a function of outputting the service UI, which is provided by the RUI server 20, onto a screen to allow a user to access or manipulate the service UI.

Each of the UPnP device RUI server 20 and the RUI client 10 provides a UPnP action to the RUI control point 30, and the RUI control point 30 is responsible for controlling the RUI server 20 and the RUI client 10. For example, when a specific service UI, which can be used by the RUI client 10, is selected from among the service UIs of the RUI server 20, the RUI control point 30 issues a connection command to the RUI client 10 so that the RUI client 10 can receive the selected service UI.

For example, when a user selects the RUI client 10 through the RUI control point 30 to display a service UI, the RUI control point 30 receives a device profile, which is supported by the RUI client 10 selected by the user, through a predetermined action (for example, a "getDeviceProfile" action) (13). In this case, the device profile is a kind of remote UI protocol (for example, XHT and HTML) that enables the rendering of the RUI client 10.

The RUI control point 30 calls the predetermined action (for example, "getCompatibleUIs" action) of the RUI server 20 using the device profile as a factor (15). In this case, the RUI control point 30 can receive a list of service UIs that are compatible with the RUI client 10 among the service UIs provided by the RUI server 20 through the call.

At the next operation, the RUI control point 30 selects a desired service UI from among the compatible service UIs, extracts Uniform Resource Locator (URL) information corresponding to the selected service UI, and calls a "Connect" action so that the RUI client 10 connects to the RUI server 20 to receive a corresponding service (17).

The RUI client 10 can remotely use the service of the RUI server 20 using the URL of the service UI through the "Connect" action (19). In this case, the communication method thereof is implemented using a separate remote protocol method other than UPnP.

However, the related art UPnP RUI described above, which is located outside the home network, does not propose an RUI model that can provide service from outside the home network due to the limited characteristics of UPnP technology, therefore such an RUI model is desired.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for providing UPnP RUI service outside a home network using OSGi technology.

According to an aspect of the present invention, there is provided an apparatus for providing RUI service, the apparatus including a service browser module communicating with a service registry, which is located outside a home network, and providing a service search UI to allow an RUI client, which is located inside a home network, to search for services that are present outside the home network; and a virtual RUI server module being responsible for intermediation so that the services present outside the home network can be used through a service UI.

According to another aspect of the present invention, there is provided a method of providing RUI service, the method including communicating with a service registry, which is located outside a home network, and providing a service search UI to allow an RUI client, which is located inside a home network, to search for services that are present outside the home network; downloading and installing a virtual RUI server bundle to and on an OSGi gateway when a desired service is selected through the service search UI; and performing intermediation so that the services present outside the home network can be used through a service UI.

BRIEF DESCRIPTION OF THE DRAWINGS

The above and other aspects of the present invention will be more clearly understood from the following detailed description of the exemplary embodiments taken in conjunction with the accompanying drawings, in which.

DESCRIPTION OF THE EXEMPLARY EMBODIMENTS OF THE INVENTION

Figure 1:
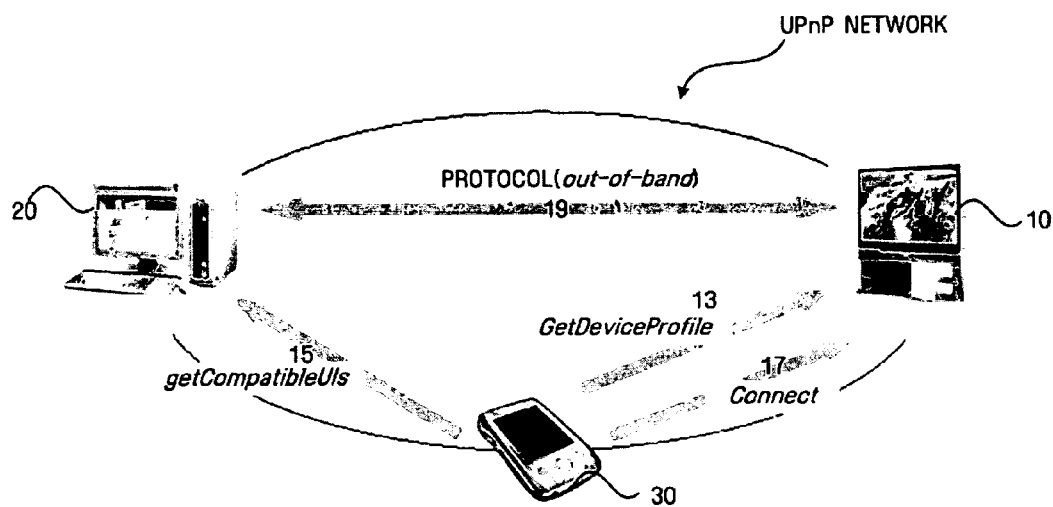
FIG. 1 is a conceptual diagram of a related art UPnP RUI.

The advantages and characteristics of the present invention, and the method of achieving them, will be apparent with reference to exemplary embodiments described in detail later in conjunction with the accompanying drawings. However, the present invention is not limited to the exemplary embodiments disclosed below, but may be implemented in various ways. Furthermore, the exemplary embodiments are provided to complete the disclosure of the present invention, and to fully notify those skilled in the art of the scope of the present invention. Like reference numerals are used throughout the different drawings to designate like components.

Principal Terms

Universal Description, Discovery, and Integration (UDDI) is an extensible Markup Language (XML)-based registry for businesses in a worldwide business list on the Internet. UDDI enables uninterrupted interactive online transactions and the interactive operation of electronic (e)-commerce on the World-Wide Web (WWW), and prepares a list using business names, products or locations, or web services and then provides the list to users.

Exemplary embodiments of the present invention are described in detail with reference to the accompanying drawings below.

Figure 2:
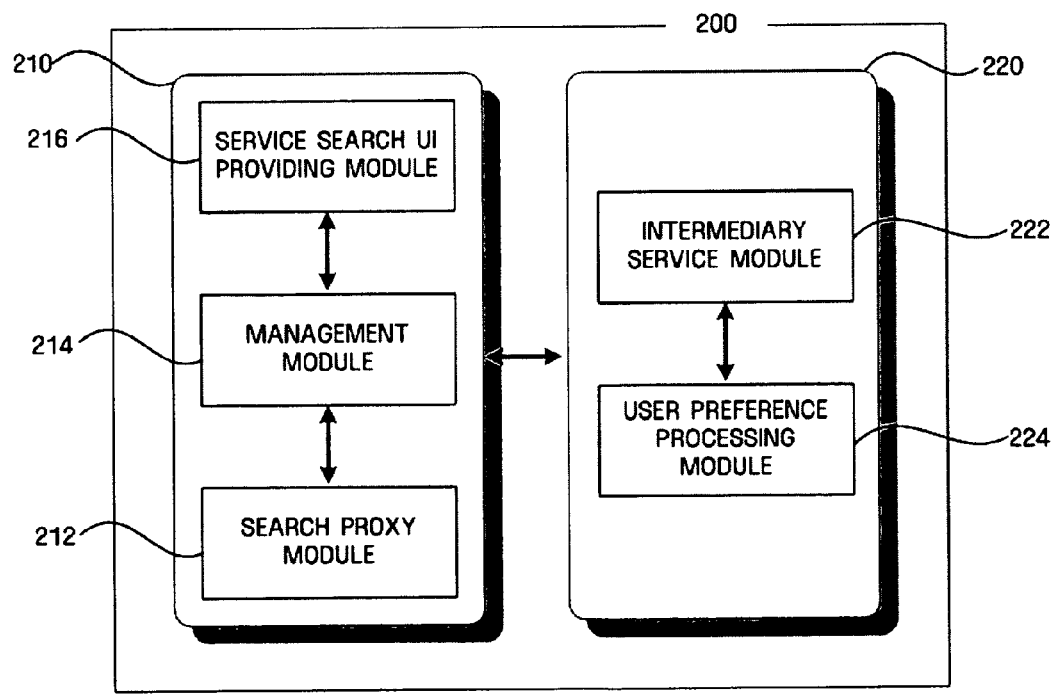
FIG. 2 is a block diagram showing the construction of an apparatus for providing UPnP RUI service according to an exemplary embodiment of the present invention.

FIG. 2 is a block diagram showing the construction of an apparatus for providing UPnP RUI service according to an exemplary embodiment of the present invention.

UPnP RUI server service is basically provided such that services outside a home network can be searched for and used in the home network using the existing UPnP RUI standard technology.

The UPnP RUI service providing apparatus 200 includes a service browser module 210 and a virtual RUI server module 220.

The service browser module 210 communicates with a service registry 40, which is located outside the home network, and provides a service search UI to allow an RUI client, which is located inside the home network, to search for services, which are present outside the home network. In this case, a UDDI server may be used as the service registry 40, and Simple Object Access Protocol (SOAP) may be used as a communication protocol.

The service browser module 210 includes a search proxy module 212, a management module 214, and a service search UI providing module 216.

The search proxy module 212 functions to search for services, which have been registered in the service registry 40 located outside the home network, and select a desired service from among found services.

The management module 214 functions to download a virtual RUI server bundle 220a, which performs a proxy function of standing proxy for the call of a service to allow the service, selected by a user, to be used in the home network, from a service provider 402, and to install or delete the downloaded virtual RUI server bundle 220a on or from an OSGi gateway. In this case, the virtual RUI server bundle 220a may be constructed using set details of user preference information about security and languages, and may be used to implement a function as an intermediary service module 222 in the RUI service providing apparatus 200.

The service search UI providing module 216, which is located in an upper layer, communicates with the service registry 40, which is located outside the home network, and provides the service search UI to allow the RUI client, which is located inside the home network, to search for services that are present outside the home network.

The virtual RUI server module 220 is responsible for intermediation so that the services outside the home network can be used through a service UI.

The virtual RUI server module 220 includes an intermediary service module 222 and a user preference processing module 224.

The intermediary service module 222 functions to mediate the services through the service UI for provision of the services while communicating with the RUI client 10 located inside the home network. Furthermore, the intermediary service module 222 functions to receive events from the service provider 402, which is located outside the home network, and transmit the received events to the RUI control point 30, which is located inside the home network, using the UPnP RUI server service. The RUI server bundle 220a may perform the proxy function through the implementation of the intermediary service module 222.

The user preference processing module 224 stands proxy for and processes the set details of user preference information about security and languages, which will be used at the time of using of the service.

The term "module," as used herein, means a hardware component, such as a Field Programmable Gate Array (FPGA) or an Application Specific Integrated Circuit (ASIC), which performs certain tasks.

Figure 3A:
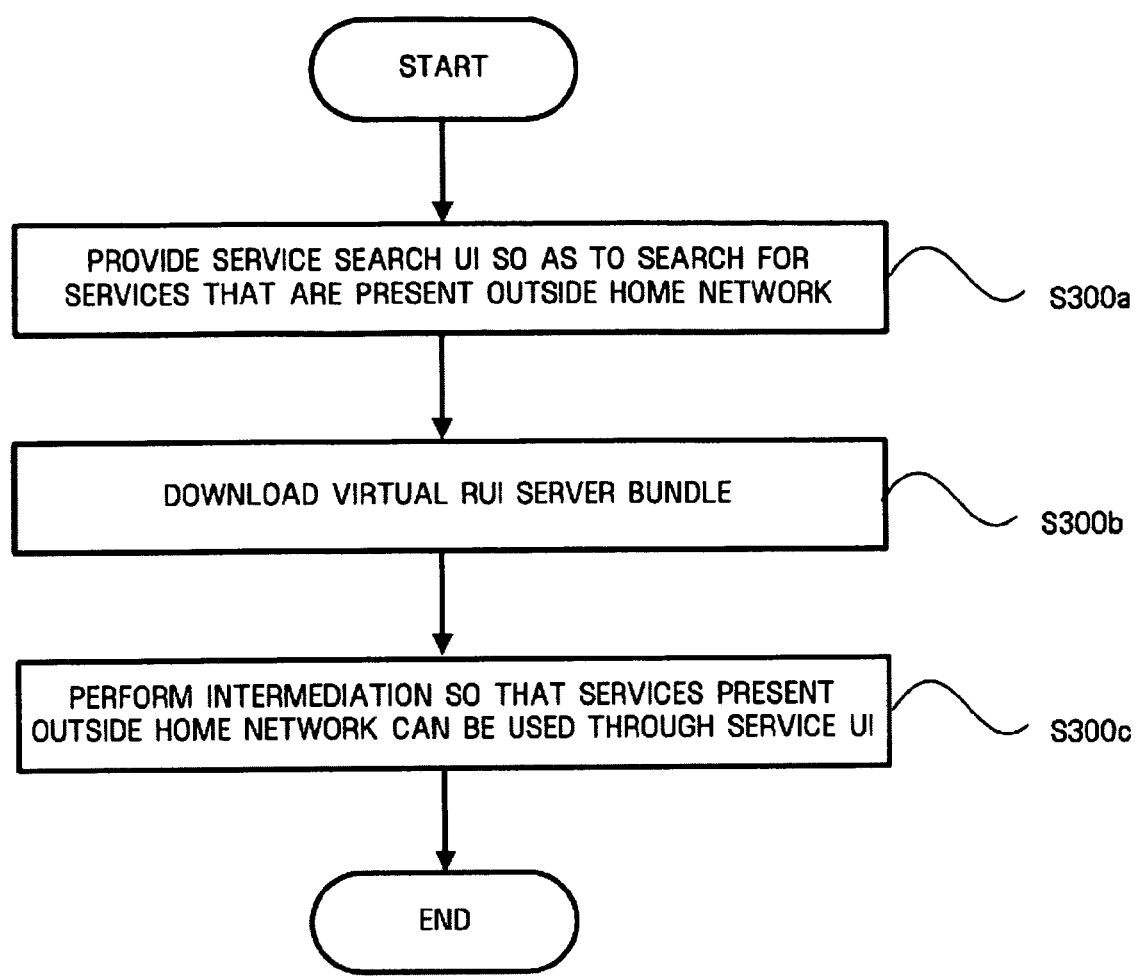
FIG. 3A is a flowchart illustrating the user of RUI services, which are present outside a home network, according to an exemplary embodiment of the present invention.

FIG. 3A is a flowchart illustrating the user of RUI services, which are present outside a home network, according to an exemplary embodiment of the present invention.

The service browser module 210 communicates with the service registry 40, which is located outside the home network, and provides the service search UI to allow the RUI client 10, which is located inside the home network, to search for services that are present outside the home network at operation S300a.

Furthermore, the virtual RUI server bundle 220a, which stands proxy for a corresponding service from the service provider 402, is downloaded and installed to and on the OSGi gate through the management module 214 of the service browser module 210 so that the service selected by the user can be used in the home network at operation S300b.

Thereafter, the virtual RUI server module 220 performs intermediation through the virtual RUI server bundle 220a so that the RUI client 10 and RUI control point 30 in the home network can use services that are present outside the home network through the service UI based on the UPnP RUI standard at operation S300c.

The detailed process of FIG. 3A is described with reference to FIG. 3B below.

Figure 3B:
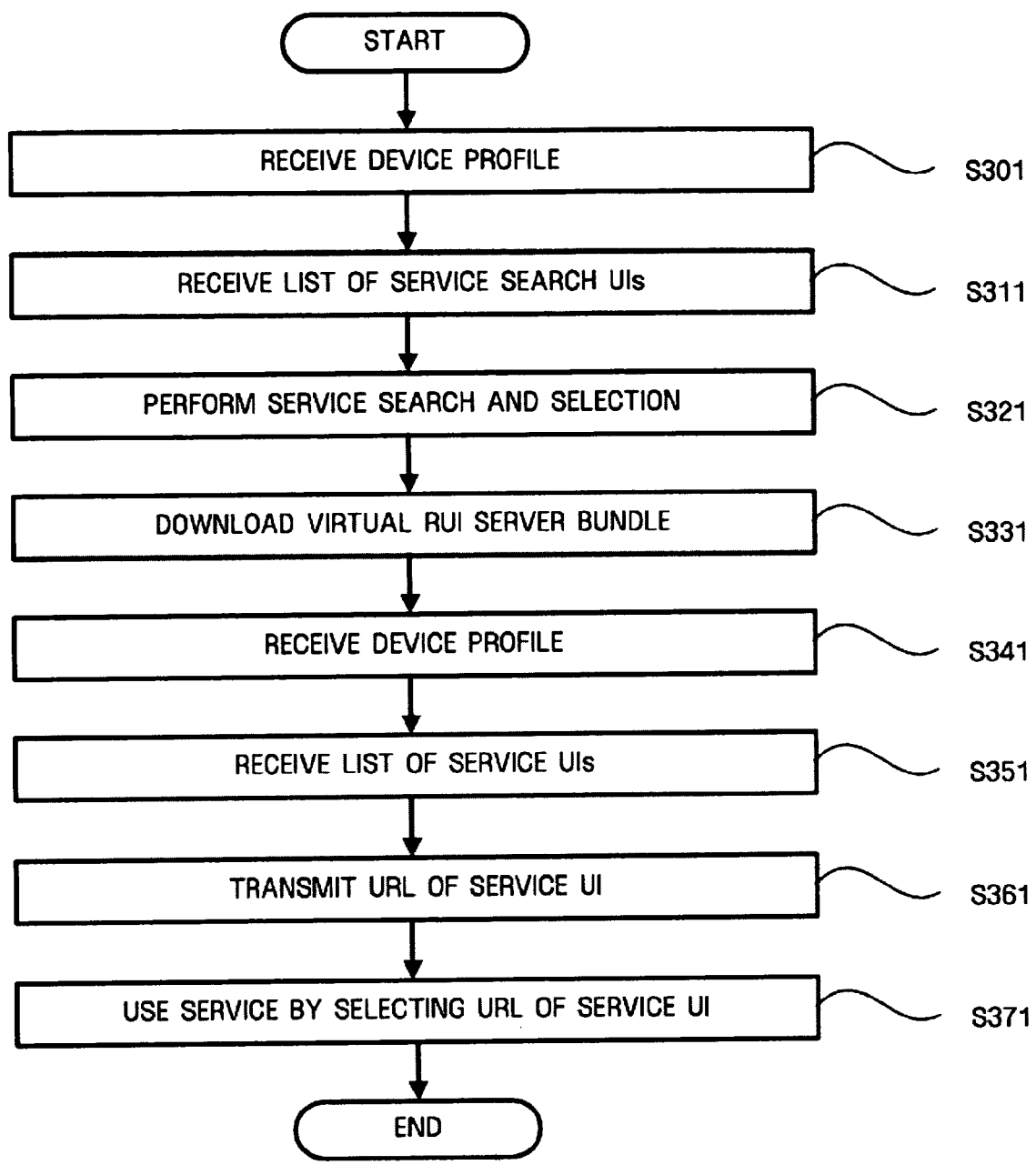
FIG. 3B is a flowchart illustrating, in detail, the use of RUI services, which are present outside the home network, according to an exemplary embodiment of the present invention.

FIG. 3B is a flowchart illustrating, in detail, the use of RUI services, which are present outside the home network, according to an exemplary embodiment of the present invention.

The RUI control point 30 in the home network receives a device profile from the RUI client 10 through a predetermined action (for example, a "getDeviceProfile" action) at operation S301.

Furthermore, the RUI control point 30 receives a list of service search UIs, which are compatible with the RUI client 10 among service search UIs, from the search UI providing module 216 through a predetermined action (for example, a "getCompatibleUIs" action) using the device profile as a factor, and then selects a specific UI at operation S311.

The RUI control point 30 calls a predetermined action ("Connect" action), and issues a command to allow the RUI client 10 to display the selected UI. The RUI client 10 searches for services and selects a desired service (for example, a music-listening service or a weather-forecasting service) through the service search UI at operation S321. In this case, the user preference information about security and languages, which will be used at the time of using of the service, may be set.

Furthermore, the RUI client 10, which is located inside the home network, communicates with the service registry 40, which is located outside the home network, through the service browser module 210, and performs a function of searching for services through the search proxy module 212 and selecting a desired service from among the found services.

At the next operation, the service browser module 210 downloads the virtual RUI server bundle 220a, which stands proxy for a corresponding service, from the service provider 402 to the OSGi gateway via the management module 214, and installs the downloaded virtual RUI server bundle 220a on the OSGi gateway to allow the service, which is selected by the user, to be used in the home network, and then the management module 214 performs advertisement via a UPnP network, at operation S331. In this case, the user preference information set at the time of the user's selection of the service is also transmitted, so that the virtual RUI server bundle 220a, to which the user preference information is applied, can be downloaded through the user preference processing module 224.

When the RUI control point 30 finds the virtual RUI server bundle 220a, the service search process is completed. Furthermore, the service browser module 210 can install the downloaded virtual RUI server bundle 220a using the Application Programming Interface (API) of an OSGi framework. The RUI client 10 and the RUI control point 30 in the home network can use service through the selected service UI using the virtual RUI server bundle 220a installed and found through the service search process.

The RUI control point 30 in the home network first receives a device profile from the RUI client 10 to receive a list of service UIs, which can be displayed by, and which are compatible with the RUI client 10 in the home network among service UIs, at operation S341.

The RUI control point 30 makes a request to the virtual RUI server bundle 220 so that the list of service UIs, which are compatible with the RUI client 10 among the service UIs that are provided by the service provider 402 located outside the home network, can be received through the device profile at operation S351. In this case, the virtual RUI server bundle 220a accesses the service provider 402, which is located outside the home network, through the intermediary service module 222, and requests the list of compatible service UIs therefrom.

The RUI control point 30 selects a service UI for a desired service from the list of service UIs compatible with the RUI client 10, and then transmits the URL of the selected service UI to the RUI client 10 at operation S361.

The user uses the desired service by selecting the URL at operation S371.

Figure 4:
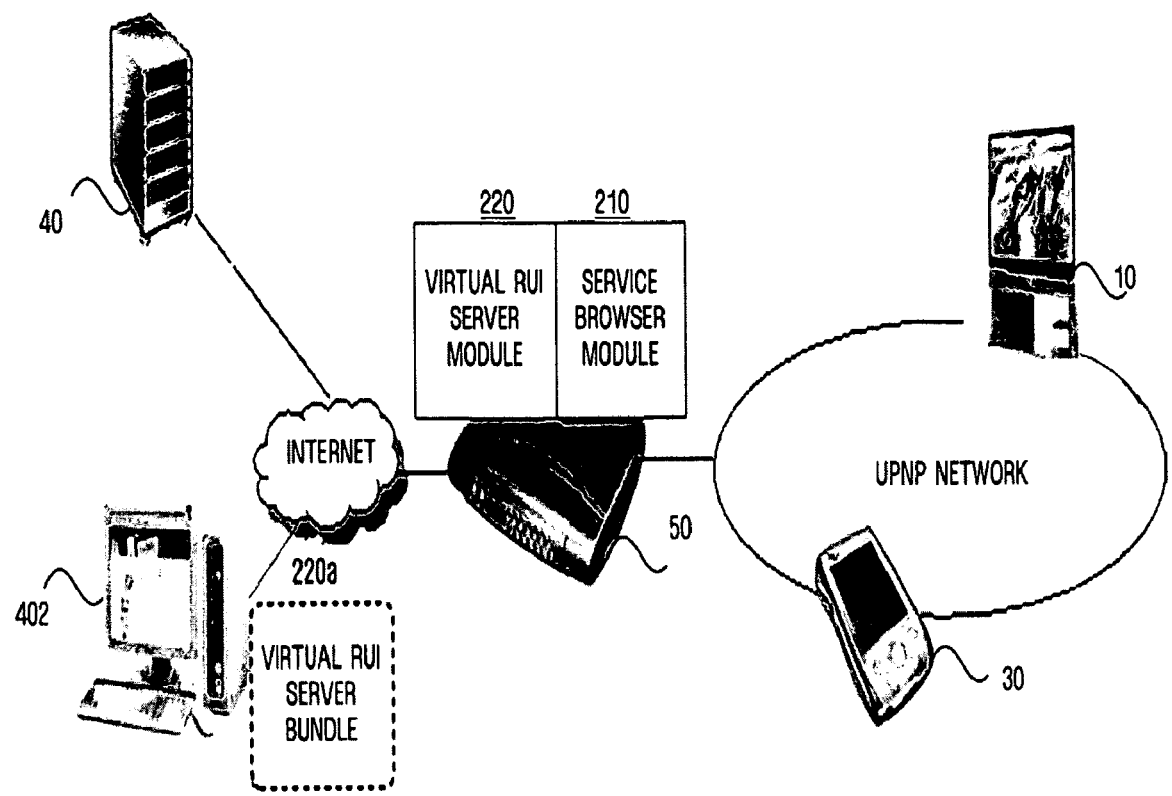
FIG. 4 is a diagram showing the construction of UPnP RUI service according to an exemplary embodiment of the present invention.

FIG. 4 is a diagram showing the construction of UPnP RUI service according to an exemplary embodiment of the present invention.

An OSGi gateway 50 is used to extend the UPnP RUI outside the home network.

The service browser module 210 communicates with the service registry 40, which is located outside the home network, through the interface of the UPnP service provider 402, and provides a service search UI to allow the RUI client 10, which is located inside the home network, to search for services that are present outside the home network.

When a user selects a desired service through the service search UI provided by the service browser module 210, the service browser module 210 downloads and installs the virtual RUI server bundle 220a to and on the OSGi gateway so that the desired service can be used in the home network. In this case, the service registry 40 is storage in which meta information about services to be provided is registered by various service providers 402 on the Internet.

The virtual RUI server module 220 performs intermediation through the virtual RUI server bundle 220a so that the RUI client 10 and the RUI control point 30 in the home network can use services, which are present outside the home network, through the service UI based on the UPnP RUI standard.

The RUI control point 30 in the home network can receive the URL of a service UI, which will be output through the RUI client 10, using the UPnP RUI server service provided by the virtual RUI server module 220. The URL is a URL for RUI intermediary service provided by the virtual RUI server module 220, rather than the actual location of the service provider 402 located outside the home network. That is, the RUI client 10 in the home network adopts the above-described method in order to use services, which are present outside the home network, via the virtual RUI server module 220, instead of directly connecting the services. The reason for this is to allow the virtual RUI server module 220 to stand proxy for the user preference information, such as security, at the time of selection of a desired service.

Furthermore, when the above-described method is used, the service provider 402, which is located outside the home network, can transmit events to the RUI control point 30 through the virtual RUI server module 2201 located on the OSGi gate 50 even though the RUI control point 30 in the home network is not assigned a public Internet Protocol (IP). Documents and standards related to the exemplary embodiments of the present invention include UPnP Device Architecture V1.0, UPnP RUI Client/Server Device Template V1.1, UPnP RUI Client/Server Service Template V1.1, and OSGi revision 3.0.

With reference to FIGS. 5 to 8, an operation of searching for services, which are present outside the home network, in the home network, an operation of actually using a service UI, an operation in which the RUI control point 30 in the home network receives events from services that are present outside the home network, and an operation of deleting services registered in the home network are described in more detail with respect to the service browser module 210 and the virtual RUI server module 220 below.

Figure 5:
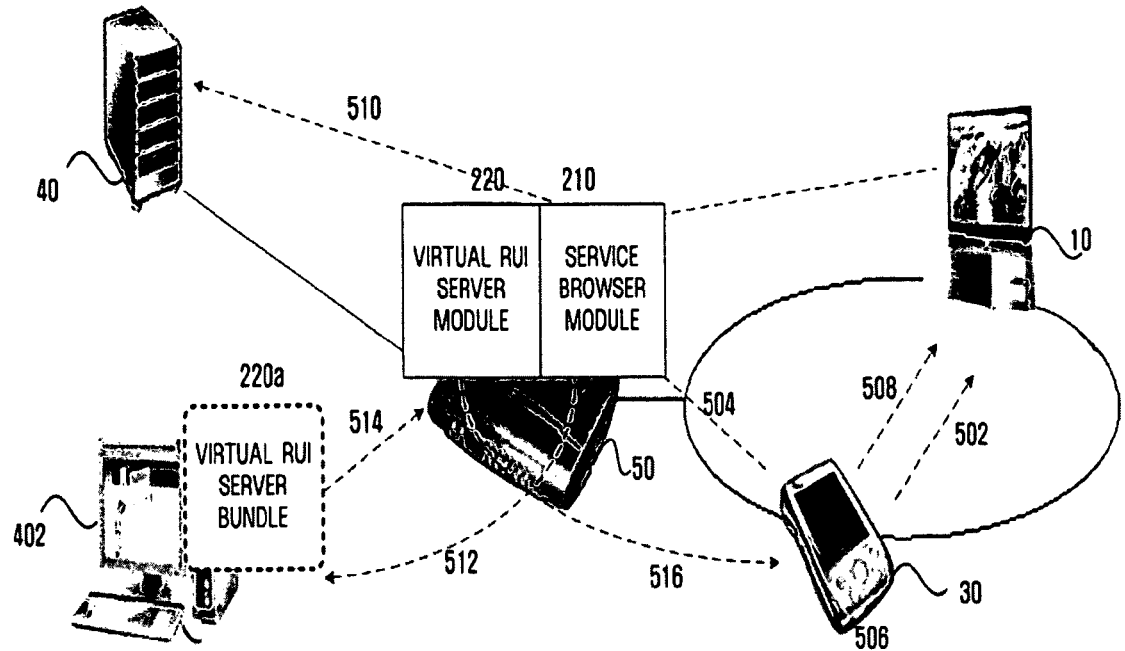
FIG. 5 is a diagram illustrating a process of searching for RUI services, which are present outside the home network, according to an exemplary embodiment of the present invention.

FIG. 5 is a diagram illustrating a process of searching for RUI services, which are present outside the home network, according to an exemplary embodiment of the present invention.

The RUI control point 30 and the RUI client 10 in the home network can search for services, which are present outside the home network, using the service search UI provided by the service browser module 210, and can select a desired service from among the found services.

The RUI control point 30 in the home network receives the device profile of the RUI client 10 through a "getDeviceProfile" action (502) to receive the service search UI, which is used to search for the services that are present outside the home network, from the service browser module 210.

The RUI control point 30 receives a list of service search UIs, which is compatible with the RUI client 10 among service search UIs provided by the service provider 402, from the service browser module 210 through a "getCompatibleUIs" action using the device profile as a factor, and selects a specific UI (504 and 506).

Next, the RUI control point 30 calls the "Connect" action of the RUI client 10, and issues a command so that the RUI client 10 can display the selected UI (508).

The RUI client 10 searches for services and selects a desired service (for example, a music listening service or a weather-forecasting service) through the service search UI. In this case, user preference information about security and languages, which will be used at the time of using of the service, may be set. Thereafter, the service browser module 210, which is located inside the home network, communicates with the service registry 40 located outside the home network, and performs a function of searching for services and selecting a desired service from among the found services (510).

The service browser module 210 then downloads the virtual RUI server bundle 220a, which stands proxy for the service selected by the user, from the service provider 402 that provides the corresponding service (512 and 514). In this case, the user preference information set at the time of the user's selection of the service is also transmitted to the service provider 402, so that the virtual RUI server bundle 220a, to which the user preference information is applied, can be downloaded.

The service browser module 210 installs the downloaded virtual RUI server bundle 220a on the OSGi gateway. After the installation, the service browser module 210 performs advertisement via the UPnP network (516). Thereafter, when the RUI control point 30 finds the virtual RUI server bundle 220a, the service search process is completed.

The service search is basically performed using the UPnP RUI technology, so that the RUI client 10 and the RUI control point 30, which follow the existing UPnP RUI standard, can perform a service search function without requiring implementation of a separate service.

Figure 6:
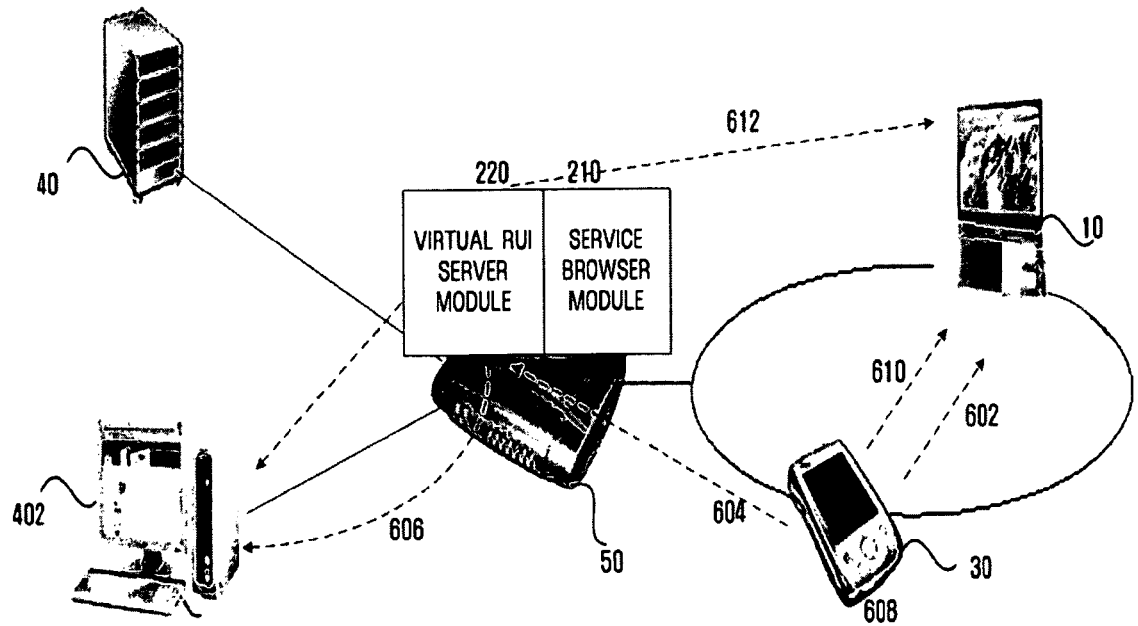
FIG. 6 is a diagram illustrating a process of using RUI services, which are present in the home network, according to an exemplary embodiment of the present invention.

FIG. 6 is a diagram illustrating a process of using RUI services, which are present in the home network, according to an exemplary embodiment of the present invention.

The RUI client 10 and the RUI control point 30 in the home network can use services through the selected service UI using the virtual RUI server bundle 220 installed and found through the service search process.

The RUI control point 30 in the home network first receives a device profile from the RUI client 10 through a "getDeviceProfile" action in order to receive a list of service UIs that can be displayed by (that are compatible with) the RUI client 10 in the home network, among service UIs (602).

Next, the RUI control point 30 makes a request to the virtual RUI server bundle 220 so that the list of service UIs, which are compatible with the RUI client 10 among the service UIs provided by the service provider 402 located outside the home network, can be received through the device profile (604).

In this case, the virtual RUI server bundle 220a accesses the service provider 402, which is located outside the home network, through the intermediary service module 222, and requests the list of compatible service UIs therefrom (606).

The RUI control point 30 selects a service UI for a desired service from the list of service UIs compatible with the RUI client 10, and then transmits the URL of the selected service UI to the RUI client 10 (608 and 610).

As described above, the RUI client 10 in the home network uses the services via the virtual RUI server bundle 220a without directly connecting to the service provider 402 located outside the home network. The reason for this is to allow the virtual RUI server bundle 220a to internally process the user preference information.

The service search is performed using the UPnP RUI technology, so that the RUI client 10 and the RUI control point 30, which follow the existing UPnP RUI standard, can perform the operation of using services without requiring implementation of a separate service.

Figure 7:
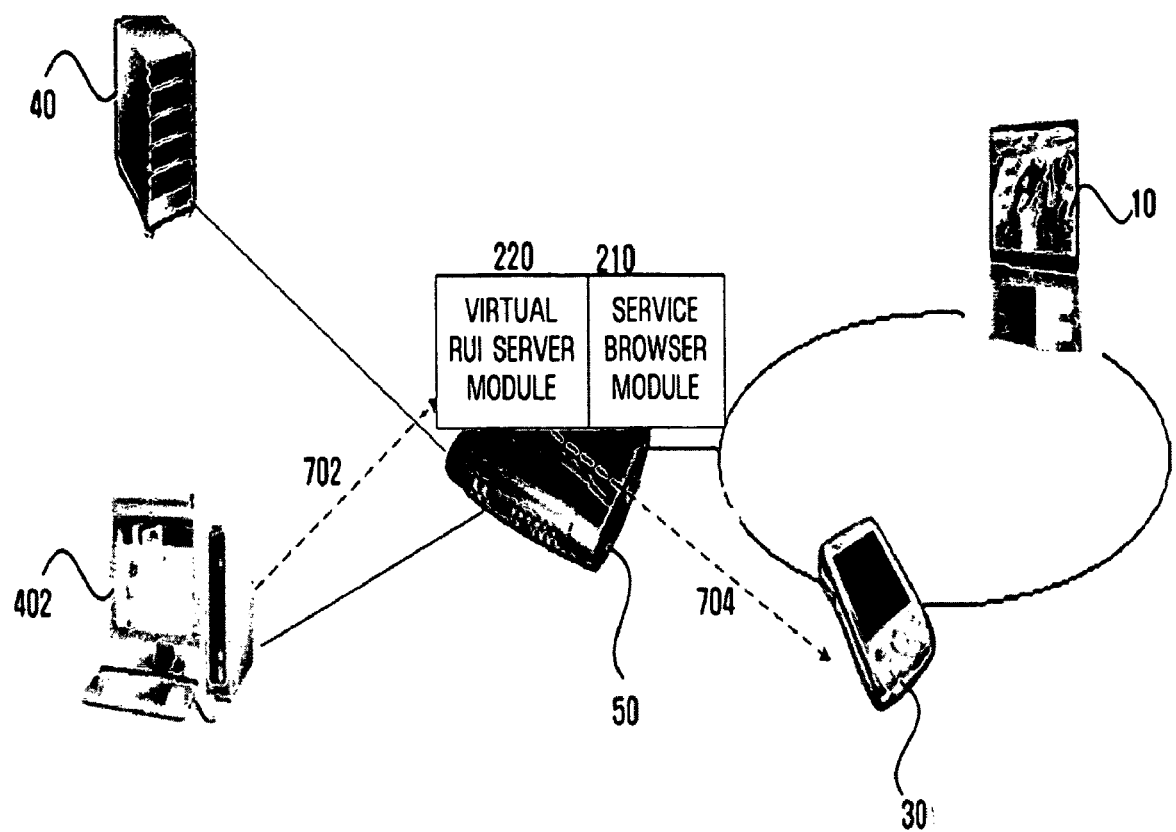
FIG. 7 is a diagram illustrating a process of receiving an event from an RUI, which is located outside the home network, according to an exemplary embodiment of the present invention.

FIG. 7 is a diagram illustrating a process of receiving an event from an RUI, which is located outside the home network, according to an exemplary embodiment of the present invention.

The possibility that the device in a home network is not assigned a public IP according to given conditions is high. When an event, for example, an update of the list of service UIs, occurs from the service provider 402 located outside the home network, the OSGi gateway 50 assigned the public IP can transmit the event to the RUI control point 30 in the home network via the virtual RUI server bundle 220a on the OSGi gateway 50 (702 and 704). In this case, the virtual RUI server bundle 220a transmits the event through the intermediary service module 222.

The method of using services is performed based on the UPnP RUI technology, so that the RUI client 10 and the RUI control point 30, which follow the existing UPnP RUI standard, can perform the operation of using services without requiring implementation of a separate service.

Figure 8:
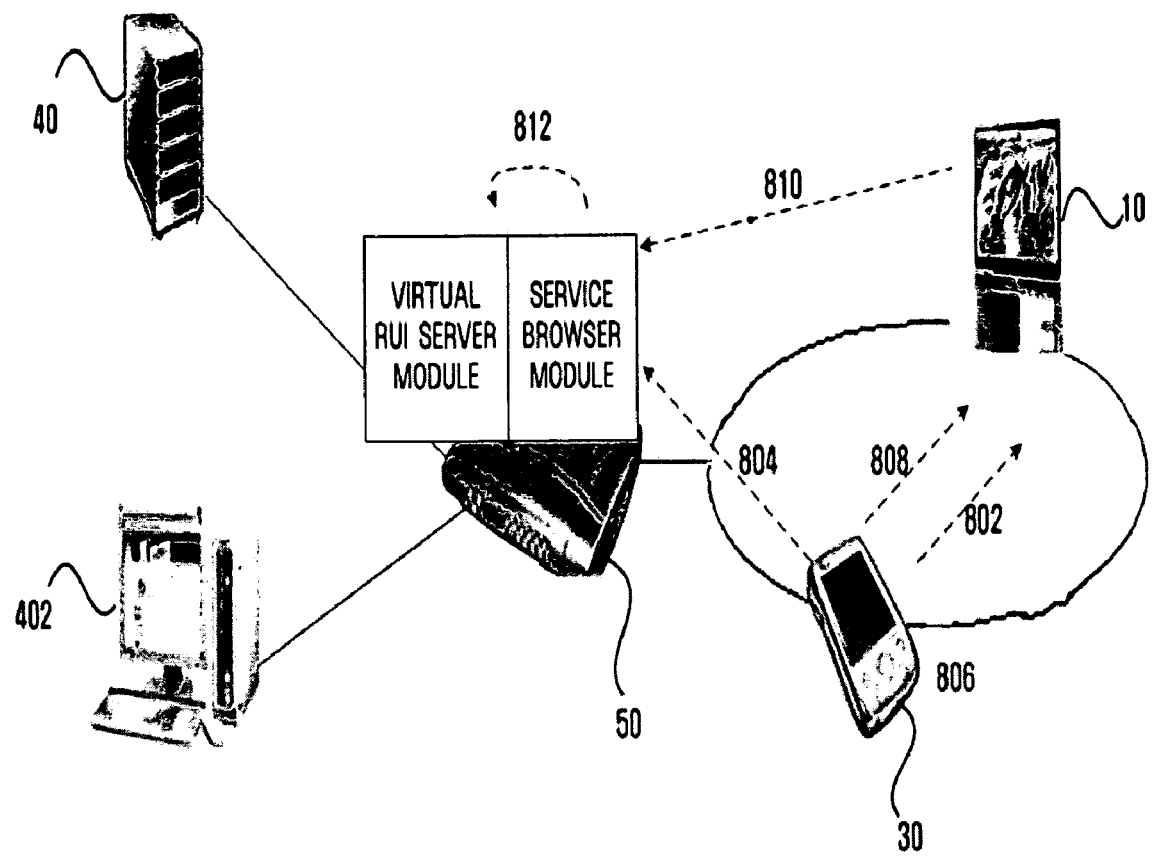
FIG. 8 is a diagram illustrating a process of deleting registered RUI service according to an exemplary embodiment of the present invention.

FIG. 8 is a diagram illustrating a process of deleting registered RUI service according to an exemplary embodiment of the present invention.

In the same manner as the service search, deletion can be performed using a service management UI provided by the service browser module 210 when a service user in the home network desires to delete the existing service for a reason such as the expiration of a service use period.

The RUI control point 30 in the home network receives the device profile of the RUI client 10 through a "getDeviceProfile" action to allow the RUI client 10 to connect to the service management search UI (802).

Next, the RUI control point 30 receives a list of service management UIs, which are compatible with the RUI client 10, using the device profile, and selects a desired service management UI from the corresponding list (804 and 806).

Furthermore, the RUI control point 30 transmits the URL of the selected service management UI to the RUI client 10, and then the RUI client 10 connects to the corresponding service management UI using the URL received from the RUI control point 30 (808 and 810).

When a user makes a request for the deletion of a specific service through the corresponding service management UI, the service browser module 210 internally deletes the virtual RUI server bundle 220a for the corresponding service (812).

The service deletion is basically performed using the UPnP RUI technology, so that the RUI client 10 and the RUI control point 30, which follow the existing UPnP RUI standard, can perform the deletion function without requiring implementation of a separate service.

As described above, in accordance with the image capturing device and the method of operating the same according to the exemplary embodiments of the present invention, one or more of the following effects may be realized:

First, UPnP RUI devices, which are operated only in the existing home network, can receive RUI services from outside the home network.

Second, since UPnP RUI, which was limited only to the UI in the home network, can be received from outside the home network, a greater variety of types of content and service can be used.

Third, since service can be provided using the existing UPnP RUI method, the technological burden of providing service is reduced.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for providing Remote User Interface (RUI) service, the apparatus comprising:
    a service browser module which provides a service search user interface (UI) to allow an RUI client located inside a home network to search for services that are present outside the home network; and
    a virtual RUI server module which performs intermediation so that the services present outside the home network can be used through a service UI, and receives events from a service provider outside the home network and transmits the received events to an RUI control point inside the home network,
 wherein the service browser module comprises a management module that downloads a virtual RUI server bundle from the service provider and installs the virtual RUI server bundle on an Open Service Gateway Initiative (OSGi) gateway, if a desired service is selected through the service search UI, and wherein the virtual RUI server bundle is constructed using set details of user preference information, and wherein the home network comprises a Universal Plug and Play (UPnP) network.

2. The apparatus of claim 1, wherein the service browser module communicates with a service registry located outside the home network in order to allow the RUI client to use the service search UI to search for services present outside the home network.

3. The apparatus of claim 1, wherein the RUI client uses the services present outside the home network, through the service UI.

4. The apparatus of claim 1, wherein the OSGi gateway is coupled to the RUI client.

5. A method of providing a Remote User Interface (RUI) service, the method comprising:
    providing a service search a user interface (UI) to allow an RUI client located inside a home network to search for services present outside the home network;
    downloading a virtual RUI server bundle from a service provider outside the home network and installing the virtual RUI server bundle on an Open Service Gateway Initiative (OSGi) gateway if a desired service is selected through the service search UI;
    performing intermediation so that the services present outside the home network can be used through a service UI; and
    receiving events from the service provider and transmitting the received events to an RUI control point inside the home network,
    wherein the virtual RUI server bundle is constructed using set details of user preference information, and wherein the home network comprises a Universal Plug and Play (UPnP) network.

6. The method of claim 5, further comprising communicating with a service registry located outside a home network in order to allow the RUI client to use the service search UI to search for services present outside the home network.

7. The method of claim 5, wherein the services present outside the home network is used by the RUI client through the service UI.

* * * * *